Oct. 21, 1941.  B. M. HYMAN  2,259,892
TRACTOR MOUNTED CORN PICKER AND HUSKER
Filed March 15, 1937  7 Sheets-Sheet 2

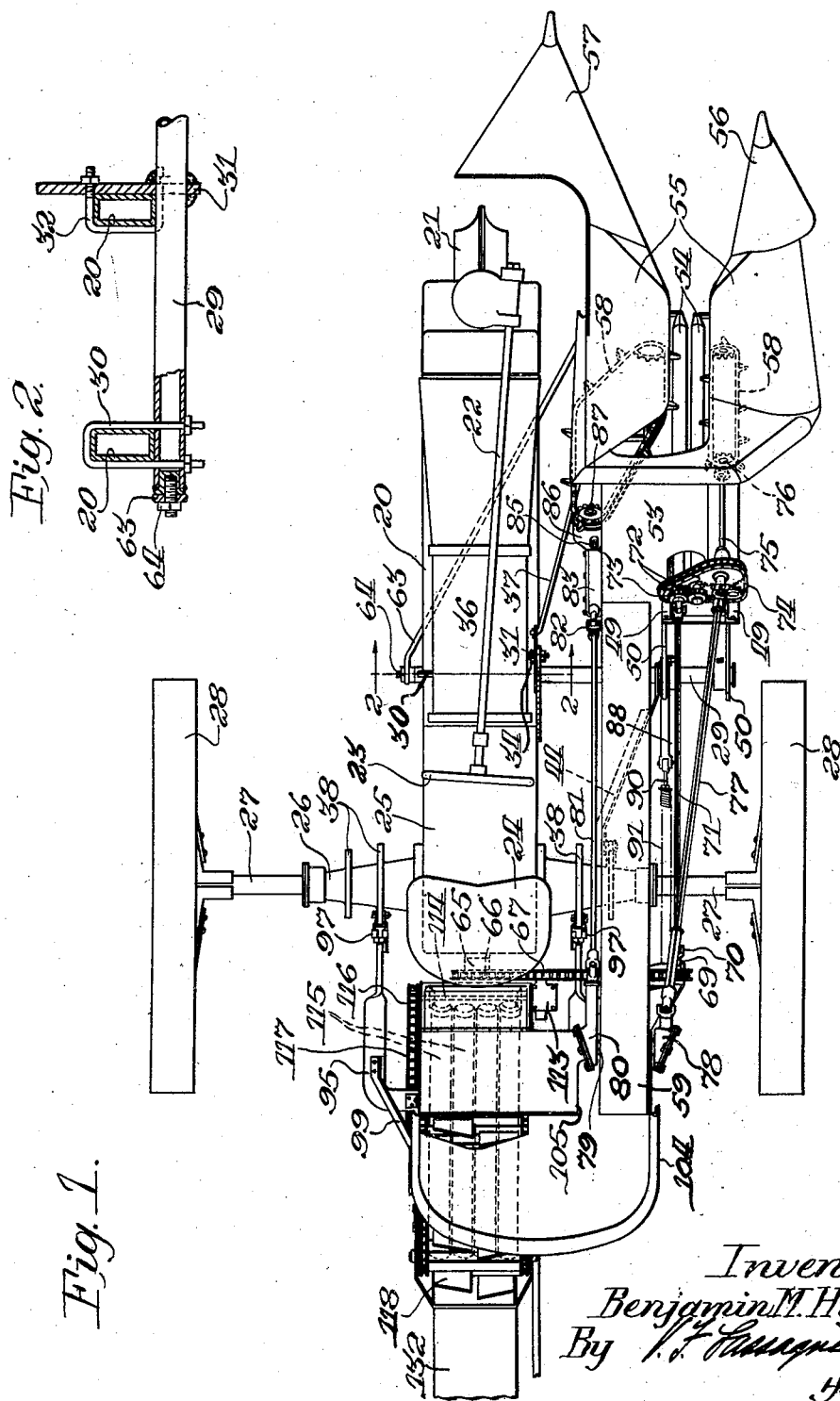

Inventor
Benjamin M. Hyman
By
Atty

Oct. 21, 1941.                B. M. HYMAN                2,259,892
               TRACTOR MOUNTED CORN PICKER AND HUSKER
                    Filed March 15, 1937         7 Sheets-Sheet 3

Inventor
Benjamin M. Hyman

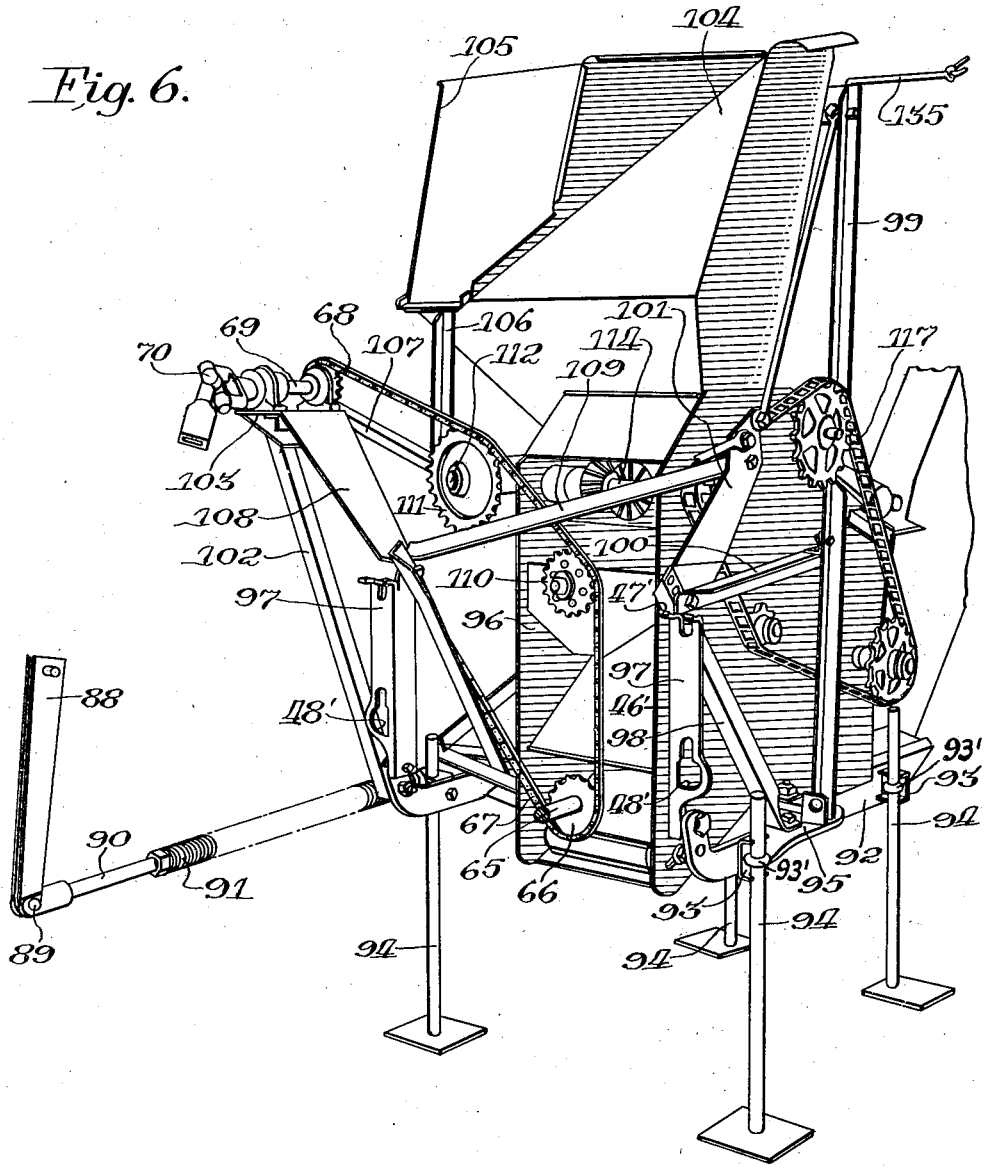

Oct. 21, 1941.  B. M. HYMAN  2,259,892
TRACTOR MOUNTED CORN PICKER AND HUSKER
Filed March 15, 1937   7 Sheets-Sheet 5
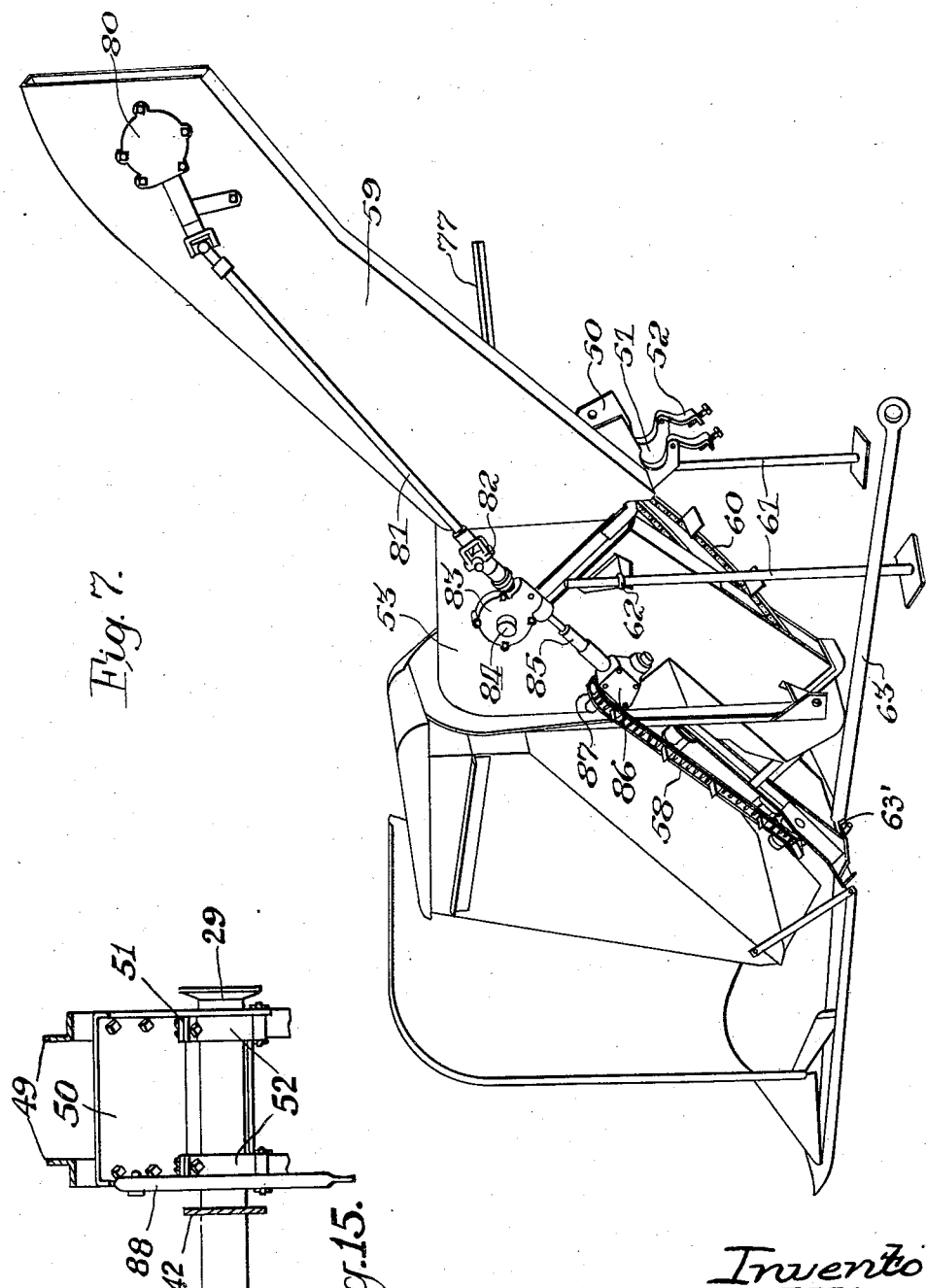
Inventor
Benjamin M. Hyman Oct. 21, 1941.  B. M. HYMAN  2,259,892
TRACTOR MOUNTED CORN PICKER AND HUSKER
Filed March 15, 1937  7 Sheets-Sheet 6
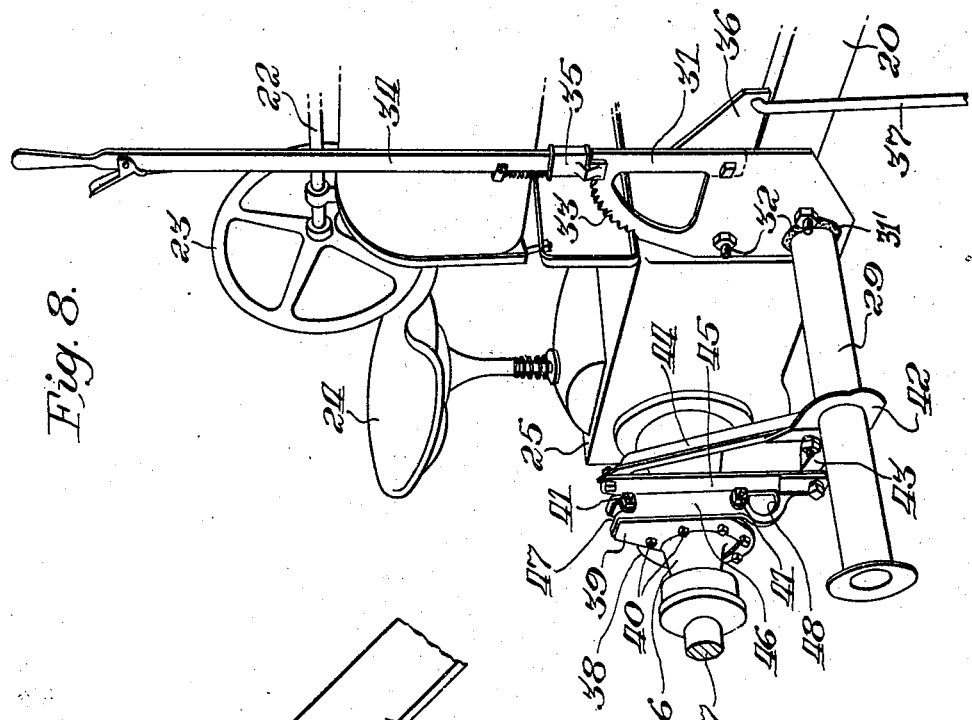

Oct. 21, 1941.   B. M. HYMAN   2,259,892
TRACTOR MOUNTED CORN PICKER AND HUSKER
Filed March 15, 1937   7 Sheets-Sheet 7
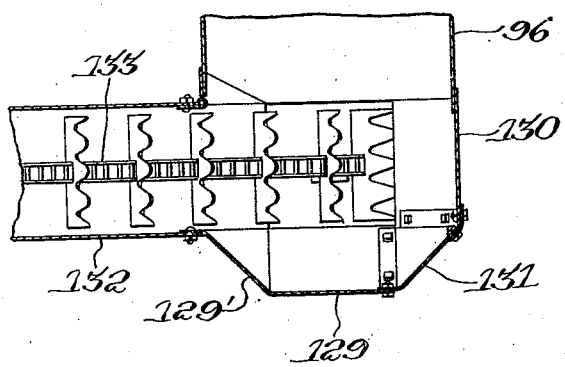
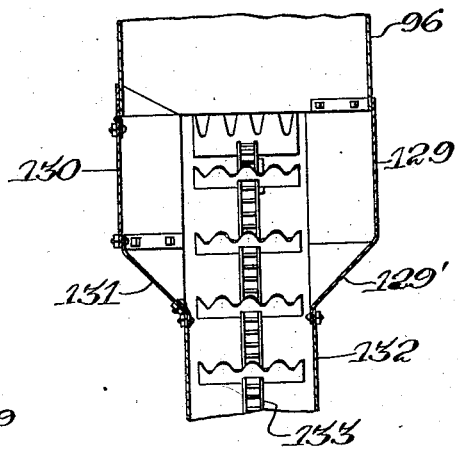
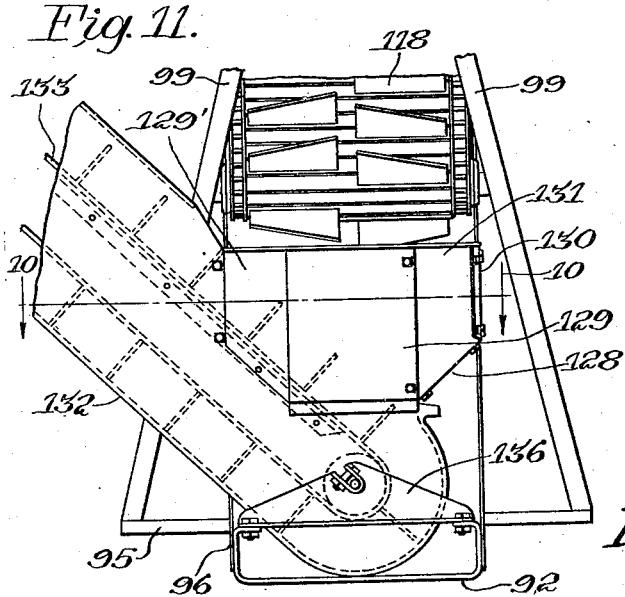
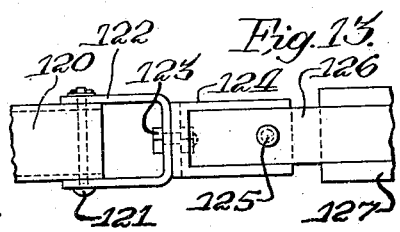
Inventor
Benjamin M. Hyman

Patented Oct. 21, 1941

2,259,892

UNITED STATES PATENT OFFICE 2,259,892

TRACTOR MOUNTED CORN PICKER AND HUSKER

Benjamin M. Hyman, Moline, Ill., assignor to International Harvester Company, a corporation of New Jersey Application March 15, 1937, Serial No. 130,916

3 Claims. (Cl. 56—18)

This invention relates to a tractor mounted corn picker and husker.

Such picker and husker machines have heretofore been provided as an attachment for mounting on so-called general purpose tractors, but, so far as is known, considerable manual labor and effort were involved in mounting the machine on the tractor and in removing it therefrom. This was so because of the great weight and bulkiness of the picker and husker structure. It is desirable that the picker and husker be capable of ready and quick association with the tractor and removal therefrom, and also that the completely assembled tractor outfit be easy to handle with the parts thereof in such relative locations as to bring about the best possible weight distribution and balance, and make for efficient control and operation thereof.

The tractor with which the improved corn picker attachment is to be used is of that type having a longitudinal, central, narrow body portion supported at its front end on a single wheel support, while the rear end of the body includes a transverse rear axle housing supported on two widely spaced, large diameter, traction wheels. The tractor is thus of the three wheel type, making it possible to locate corn picker structure ahead of the rear axle alongside the body and between the body and the line of travel of the adjacent rear traction wheel. If only one row of corn is to be harvested, then only one gathering unit is carried by the tractor at the side thereof, whereas, if two rows are to be harvested, then a gathering unit would be carried at each side of the tractor. In the present disclosure, a one row machine will be shown and described, since the two row machine would only be in the nature of a duplication.

The main object of the invention is to provide an improved tractor mounted and driven corn picker and husker.

Another object is to provide such structure in the form of separate picker and husker units adapted separately to be attached to the tractor to facilitate the assembly of the attachment to and removal thereof from the tractor.

Another object of the invention is to provide such units, which, standing by themselves apart from the tractor, are unstable, but include adjustable legs to make them stable and adjustable to different heights whereby the tractor may be driven alongside or into a leg supported unit to facilitate the attachment of these units to the tractor.

Another object of the invention is to provide means whereby quick attachment and detachment of said units with respect to the tractor will be possible.

Still another object of the invention is to provide an improved support in the nature of an outrigger from the body of the tractor in advance of the rear axle for adjustably carrying the picker unit.

Another object of the invention is to provide an improved and simplified mechanism for power driving all operative parts of the picker and husker from the power take-off shaft of the tractor.

Another object is to provide an improved support for the husked ear discharge elevator.

Another object of the invention is to provide an improved discharge elevator associated with the husker unit at the rear of the tractor in such a manner as to adapt it for discharge of the husked ears longitudinally rearwardly, or laterally and transversely outwardly at right angles to the line of draft.

Still another object is to provide in association with the rear mounted husker unit an improved rearwardly extending wagon hitch for pulling a wagon behind the tractor outfit, said wagon to receive the discharged ears from the husker discharge elevator.

Other important objects will become apparent to those skilled in this art as the disclosure is more fully made.

Briefly, these desirable objects are accomplished in a corn picker and husker attachment adapted to be completely carried on a tractor of the three wheel general purpose type heretofore mentioned, and in which the tractor body rigidly carried a transversely extending support located forwardly of the rear axle housing of the tractor. If the harvester is to handle only one row of corn, then such support will be arranged at one side of the tractor only, and, if the harvester is to be of the two row type, then there would be such a support at each side of the tractor.

The picking or gathering mechanism is a unit by itself, which, when standing on the ground detached from the tractor, includes an elevator. Such unit, per se, in detached relation is unstable and, therefore, includes adjustable legs or props for supporting the same on the ground in such a manner and at such a level that it is possible to drive the tractor alongside the unit until the unit is in position with respect to the tractor which will make it possible conveniently to attach the picker unit to the tractor. Said unit includes a simple form of clamp means which is connectable detachably to the transverse support extending from the tractor in such a manner that the entire picker unit may pivot up or down about the axis of the transverse support on the tractor. The tractor carries a lever immediately accessible to the operator on the tractor for adjusting the gathering or picking mechanism up or down in relation to the ground, and the operative parts of the gathering or picking unit are connected to be driven from the usual rearwardly extending power take-off shaft at the rear end of the tractor. Further, the picking or gathering unit includes an elevator for conveying picked ears upwardly and rearwardly alongside the tractor into a husking unit carried rigidly at the rear end of the tractor and suspended from the rear axle housing thereof.

This husking unit also is carried on adjustable legs to stand the same on the ground when detached from the tractor, said legs making it possible to place the husking unit at such a level that the tractor can be backed into the unit for making it possible conveniently to attach the husker unit to the axle housing of the tractor, rigidly and securely, and the attaching means being of such a character that the attachment may be quickly accomplished. The husker unit includes a hopper for receiving snapped ears from the elevator of the picker unit, the husker having operative parts which also are driven by power derived from the power take-off shaft of the tractor. The husker includes a hopper to receive the husked ears, and, associated with such hopper, is an elevator which may be positioned to extend longitudinally rearwardly parallel to the line of draft. This elevator serves to discharge the husked ears into a wagon connected to the husker unit by an improved form of hitch, said wagon receiving the husked ears from the elevator. This discharge elevator also may be swung around and be positioned along a line disposed transversely or at right angles to the line of draft for discharging the husked ears into a wagon disposed alongside the line of draft of the tractor mounted harvester, if desired.

The picker unit and the husker unit are so located relatively with respect to each other and are so mounted on the tractor as to achieve the best possible balance and relationship of parts, so as not to interfere with the good running of the tractor. Further, the parts are so related to the driver's station on the tractor that he can watch the harvester mechanism operate and also has complete and easy control of the harvester mechanism, so as to facilitate adjustments thereof.

The above structure is shown in detail in the accompanying sheets of drawings, wherein—

Figure 1 is a general plan view of the assembled tractor mounted picker and husker;

Figure 2 is a detail transverse sectional view, showing the support for the picker on the tractor taken along the line 2—2 of Figure 1, looking in the direction of the arrows;

Figure 3 is a side elevational view of the structure shown in Figure 1, viewed from the stubbleward side of the tractor;

Figure 6 is a general perspective view of the husker unit, per se, showing the front of the unit by which it is adapted to be connected to the tractor;

Figure 7 is a similar view of the detached picker unit, per se;

Figure 8 is a detail perspective view of the picker support on the tractor along with the adjusting mechanism for the picker;

Figure 9 is a side elevational view of a detail of the brace structure for the picker support on the tractor, taken from the side of the tractor shown in Figure 8;

Figure 10 is a detail plan view, partly in section, of the ear discharge elevator at the rear end of the husker with the elevator in its transverse position, said view being taken along the line 10—10 of Figure 11, looking in the direction of the arrows;

Figure 11 is a rear view of the discharge elevator shown in Figure 10;

Figure 12 is a view, similar to Figure 10, of the discharge elevator and hopper shown in section, with the elevator arranged longitudinally to the rear, as seen in Figure 3;

Figure 13 is a fragmentary plan view of the wagon hitch as viewed from the line 13—13 of Figure 3, looking in the direction of the arrows.

Figure 14 is a detail view in plan, showing the attachment of supporting members to the rear axle; and, Figure 15 is an end view, partly in section, of parts shown in Figure 9.

Figure 5:
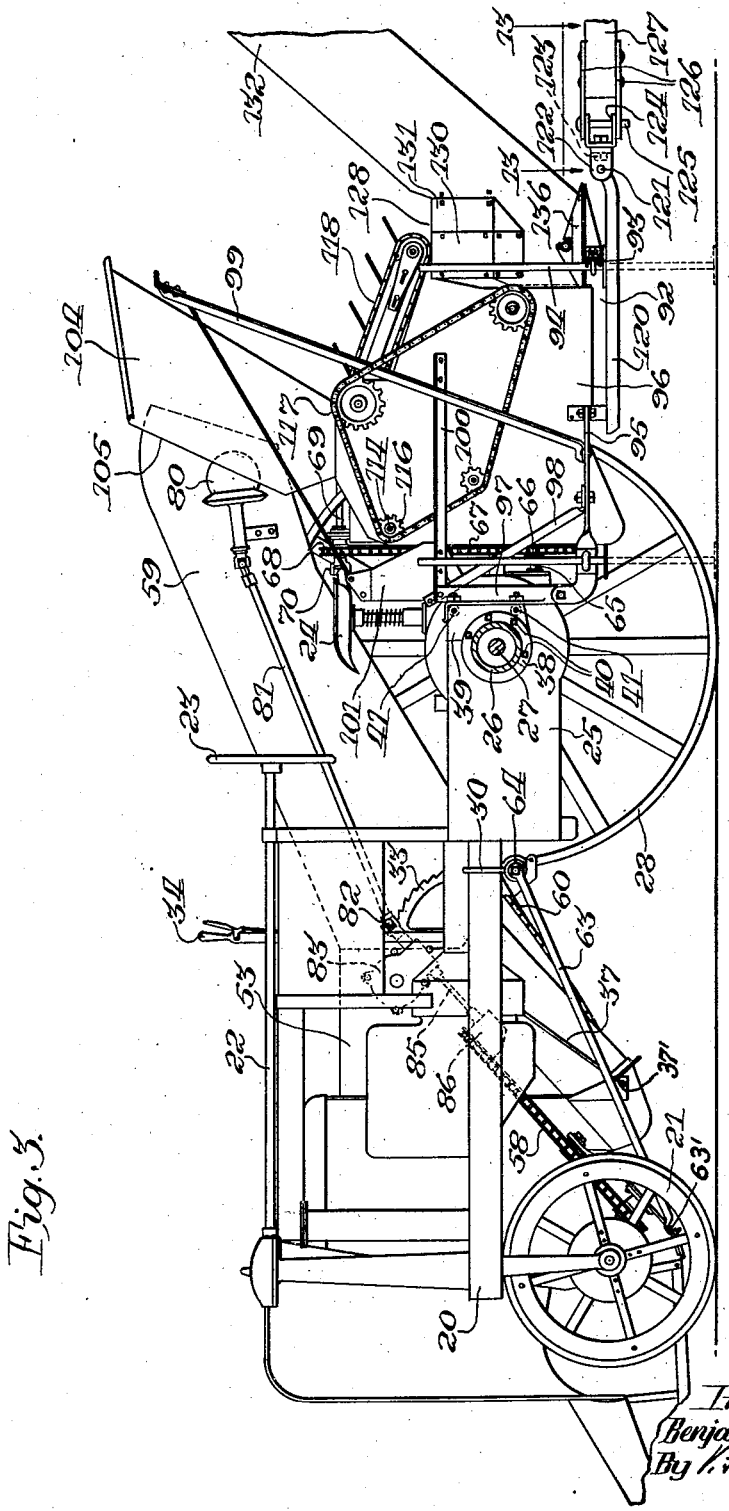
Figure 5 is a front elevational view of the assembled structure.

Looking at Figures 1, 2 and 3, it will be seen that the tractor is of the general purpose type having a narrow longitudinal body composed of side frame members 20, which frame or body at its front end is supported on a single steering wheel truck 21 turnable by steering connections 22 including a steering wheel 23 disposed in the usual relation to a driver's seat 24 mounted on the rear end of the body 20 of the tractor, which body includes a gear box 25, from which on opposite sides thereof extend hollow rear axle housings 26 including rear axles 27 and widely spaced, large diameter driving traction wheels 28. The tractor thus is of the three wheel type.

Rigidly connected to the rear ends of the side frame members 20 of the tractor body is a transverse support in the form of a hollow stationary shaft 29, which is bolted to one of the side frame members 20 by a U-bolt 30 and which at its opposite side is passed through a vertical plate 31, to which said shaft 29 is rigidly secured, as by welding. The shaft 29 constitutes an outrigger support for the picker unit. The plate 31 in turn carries a U-bolt 32, as shown in Figure 2, which embraces the adjacent side frame member 20 for securing the shaft 29 to said adjacent side frame member 20. The upper edge of the vertical plate 31 is provided with an arcuate rack or quadrant 33 and, pivotally associated with said plate 31 in any desired manner is an upstanding lever 34 positioned accessible to the operator on his seat 24. Associated with the lever is the usual detent mechanism 35 for locking the lever to the teeth of the rack 33 to hold the same in any desired position of adjustment, said lever 34 at its lower end including an extension 36 that swings with the lever, and in its lower-most position in a forward direction rests on the adjacent side frame 20 of the tractor body, thus limiting the movement of the lever in a forward direction in a manner that will be perfectly obvious. Connected to the front end of the extension 36 is a link 37 for a purpose later to be made known.

Figure 4:
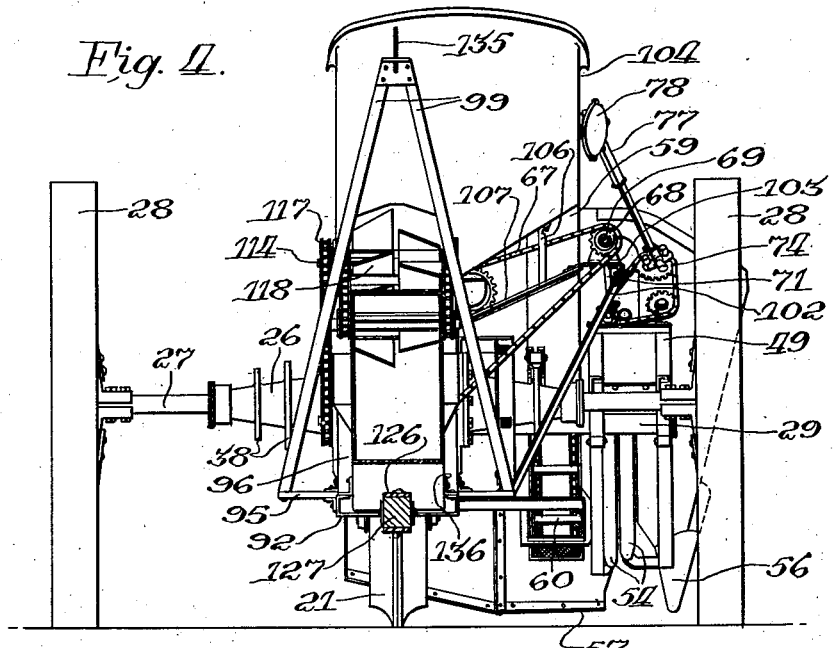
Figure 4 is a rear elevational view of the assembled structure.
Figure 5:
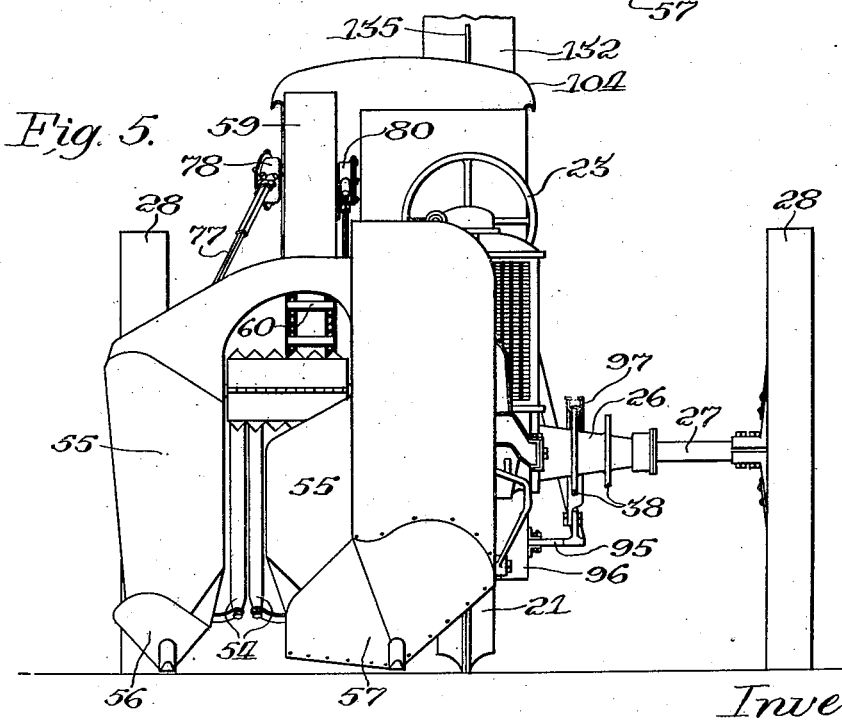

As shown in Figures 1, 3 and 4, the axle housings 26 each include an inner integral flange or pad portion 38 and an outer flange 38', which portions are in the nature of circular flanges that lie in vertical planes. The flanges 38' each have a pair of plates 39 secured thereto by bolts 40. These coupling plates 39 are arcuately formed to fit the circular contour of the axle housing 26 and are arranged in pairs, so that one is disposed on each side of each flange 38. Each set of plates 39 provides a vertical edge between which at the upper and lower corners is arranged an eye bolt 41 serving as a coupling means for attaching parts later to be described, to the tractor. For example, as shown in Figures 8 and 9, the laterally extending support 29 includes a bracket 42 to which is connected a rearwardly extending brace 43 and a rearwardly and upwardly extending brace 44. The brace arms 44 and 43 are angularly related and their rear ends are connected to a vertical plate 45 forming a triangle, which latter plate or bar 45 includes a vertical flange portion 46 formed with a right angularly bent claw portion 47 at its upper end and a key-hole slot 48 at its other end. It can now be seen that this triangle brace structure shown in Figure 8 is coupled to the vertical front edge of two adjacent coupler plates 39 secured to a flange portion 38 on the rear axle housing 26 with the claw portion 47 hooked over the upper front edge of the pair of plates 39, with the upper eye bolt 41 fitting into the claw in a manner permitting the upper end of the flange 46 to be secured to the eye bolt by means of a nut, as shown. The lower portion of the flange 46 is so disposed that the lower eye bolt 41 cooperates with the key-hole slot 48 to secure the lower portion of the member 45 to said coupler plates 39. It will thus be seen that the outrigger support 29 constitutes a support unit, which can be quickly coupled to the rear axle housing of the tractor by the quick attachable coupler means just described and by the U-bolt coupler means heretofore described and shown in Figure 2 for detachably coupling the opposite end of the support 29 to the side frame members of the tractor body.

The picker or gathering unit will next be described, the same being shown best in Figures 1, 3 and 7. This unit, per se, as shown in Figures 7 and 9, involves an upwardly and rearwardly inclined frame composed of two spaced angle bars 49, each cross-connected by a bracket structure 50, which includes a wide bearing bracket 51 on its under side including a hinged clamp 52, so that said bearing portion 51 may be positioned to embrace the outrigger pipe 29 and then, by means of the quickly attachable and detachable clamps 52, be securely bolted in place to said outrigger pipe 29 in a manner permitting the frame 49 to have rocking or pivotal movement about said outrigger support 29. The frame 49 of the picker unit, as shown in Figures 1 and 7, carries a housing 53 for enclosing the upper ends of the usual pair of upwardly and rearwardly inclined snapping rollers 54. The frame also carries the usual shields or gathering boards 55 disposed on opposite sides of the rollers 54 to provide a gathering throat for the passage of the standing corn stalks as the machine passes along a row of corn stalks in a well known manner to enable the snapping rollers 54 to pinch or snap the ears from the standing stalks. These gathering boards 55 include the usual outer gathering point 56 and the inner gathering shield 57, which is disposed in advance of the wheel 21 of the tractor to deflect stalks into the throat provided between the gathering boards 55 to enable the rollers 54 effectively to engage the stalks all in a manner well known in this art. Associated with each gathering board 55 is an endless gathering chain 58 to assist in bringing the stalks into proper position in relation to the picking rollers 54. The rollers 54 and the chains 58, of course, must be driven, and such a drive will presently be explained. Extending upwardly and rearwardly from the housing 53 at one side of the upper end of the rollers 54 is an upwardly and rearwardly extending elevator housing 59 enclosing an endless elevator conveyor 60 for conveying ears snapped by the rollers 54 upwardly and rearwardly to be delivered into a husking unit subsequently to be described.

This picker unit, as shown in Figure 7, at its front end rests on the ground and at its rear end at the point 51 is attached to the tractor support 29 to make the same stable when the unit is in operative position when attached to the tractor. When it is detached from the tractor, as shown in Figure 7, said unit at its rear end is unstable because of the overhanging weight of the elevator 59, and for that reason two leg supports 61 are provided and adjustably connected to opposite sides of the housing 53 by clamps 62. Obviously these two leg supports 61 may be raised or lowered relative to the housing 53 to support the rear end of this picker unit at the proper elevation. When the unit is supported, as shown in Figure 7, the tractor can be driven alongside the unit in such a manner as to position the bearing 51 at the proper elevation with respect to the outrigger support 29, so that the clamps 52 may be conveniently secured around the support 29 to secure the picker unit to the tractor. So that the unit will be properly braced and stabilized, an auxiliary brace or stabilizer 63 is connected between a forward point 63' of the gathering frame and the opposite end of the support 29, as shown in Figures 1 and 2, with a fastening means 64 being provided to secure the said brace 63 securely to the opposite outer end of said support 29.

As shown in Figures 1, 3 and 6, the tractor has a rearwardly extending power take-off shaft 65, the rear end of which carries a sprocket wheel 66, around which is disposed a laterally extending drive chain 67, said chain serving to drive a sprocket wheel 68 on a shaft 69, which is coupled by means of a universal joint 70 to a forwardly extending drive shaft 71, which at its front end drives a nest of two gears 72 secured to the snapping rollers 54 for turning these rollers in the usual manner in opposite directions. This nest of gears 72 also drives a sprocket wheel 73 secured to one roller 54, around which is trained a chain 74 for driving a shaft 75, which at its front end turns driving parts 76 to operate or drive the outer gathering chain 58. Said shaft 75 also is coupled to drive an upwardly and rearwardly extending shaft 77, which is connected at its upper end to drive a set of bevel gears in a housing 78 at the upper end of the elevator 59. A shaft 79, passing through the upper end of said elevator housing, drives the elevator conveyer 60. This shaft 79 also drives a bevel gear set in a housing 80 on the opposite side of the elevator housing 59, as shown in Figure 7, said gears in the housing 80 serving to drive a forwardly and downwardly extending shaft 81, which is connected, through a universal coupler 82, to drive gearing in a box 83 at the side of the housing 53 for operating a shaft 84 and turning parts located in the housing 53 not necessary to describe. The gearing in the housing 83 serves to drive a shaft 85, and, by an appropriate gearing in a box 86, a sprocket wheel 87 is driven to drive the inside gathering chain 58. Of course, it will be understood that, when the picker unit has been operatively coupled to the tractor, the legs 61 will be raised off the ground, so that they will be clear of the ground when the picker is pushed ahead by the tractor.

The rod 37 is coupled to an appropriate forward point 37' on the picker unit, as indicated in Figures 1 and 3, so that, when the operator on the tractor swings the lever 34 rearwardly, the picker unit will be raised pivotally about the axis of the outrigger support 29 for adjusting the gathering points 56 and 57 in relation to the ground to facilitate such adjustment, and, because of the weight of the picker unit, a counterbalancing spring mechanism is provided, which will now be described.

One of the plates 50, shown in Figure 9, has securely fastened thereto a downwardly and rearwardly extending arm 88, the lower end of which includes a pin 89 for the pivotal connection thereto of a rod 90. Connected to the rod 90 is a coil spring 91 extending rearwardly and adapted to be coupled to the husking unit, later to be described. This counterbalancing mechanism is also shown in Figure 6, where it will be seen that at the rear, is a part of the husking unit not yet described and that the arm 88 may be detachably, rigidly coupled to one of the plates 50 in the assembly of the complete organization to make the counterbalance spring effective in relation to the axis of the outrigger 29 properly to spring the weight of the picking mechanism disposed in advance of said outrigger support 29 and about which said picker mechanism is pivotally mounted. The husking unit will next be described, and in that connection attention is called to Figure 6, where the unit per se is shown detached from the tractor. This unit comprises a suitable support 92 which has secured thereto suitable clips 93 in which are adjustably carried by suitable clamping means 93' upright legs or stands 94. In the embodiment shown, each side of the support 92 carries two legs 94, so that in all four legs or feet are provided to support the husker unit, which is mounted on the support or frame 92. The frame 92 is carried by a U-shaped support 95, which extends rearwardly and laterally. The supporting frame 92 carries a suitable upright housing 96 at each side of which is bolted the flange of an angle bar 97, which bar is vertically disposed, and on each side of the housing is connected by a diagonal brace bar 98 rigidly to the support 95. It will be observed that each upright angle bar 97 at each side of the housing 96 constitutes a quick attachable means similar to that heretofore identified by the numeral 46 and for that reason the present bars will be characterized by the number 46'. Each attaching portion 46' includes at its lower end a key-hole slot 48' and at its upper end is formed with a claw portion 47'. By means of plates 39 connected to the inner flanges 38 on the axle housing 26 and bolts 41, the husking unit of Figure 6 is readily attached to the tractor axle, as shown in Figure 14. The rear end of the support 95 has secured thereto an upright A-frame 99 spanning the sides of the housing 96 for a purpose later to appear, said A-frame including a horizontal brace 100, which, along with the side of the housing 96, carries a bracket 101. The opposite side of the housing, as shown in Figure 6, carries a brace 102 for supporting a platform 103, on which the stub-shaft 69 heretofore described is carried. The top of the housing 96 carries a hopper 104 open at its front side, as indicated at 105, the front portion of the hopper being suitably supported by a vertical brace 106 carried by a tie brace 107 running between the housing 96 and the platform 103. The platform 103 is partly carried by a bracket 108, which is suitably braced as shown, which brace structure includes a cross tie 109 extending to the bracket 101 on the opposite side of the housing 96.

The chain 67 heretofore described passes around an idler sprocket 110 carried on the front wall of the husker housing 96, as shown in Figure 6, the chain 67 serving to drive a sprocket wheel 111, which serves to drive a longitudinal shaft 112 that passes into a gear box 113, which houses a bevel gear set, not shown, to drive a transverse shaft 114, whereby, in any usual manner, a set of longitudinally disposed husking rollers 115, located in the upper part of the housing 96, may be driven to remove the husks from ears delivered on to rollers 115. The shaft 114, as shown in Figures 1 and 3, extends to the stubbleward side of the housing 96 to drive a sprocket wheel 116, thereby driving a sprocket chain 117. This chain 117, as generally indicated in Figure 3, drives other interior mechanism of the husker not necessary herein to be described, among such mechanism being an ear forwarding conveyer 118, which cooperates in the usual manner with the husking rolls 115 to press the ears yieldably down onto the rollers, so that they will efficiently perform their duty of removing the husks from the ears.

The rear end of the counterbalancing spring 91, as indicated in Figure 1, is appropriately secured to the gathering side of the frame structure associated with the housing 96, as indicated in Figure 1.

A longitudinal draw frame element 120 is rigidly secured underneath the housing 96, as indicated in Figure 3, which at its rear end is disposed in back of the housing 96 and carries a horizontal, transverse hinge pin 121. As shown also in Figure 13, a U-shaped bracket 122 is connected to the pin 121 for pivotal movement, and the bight of the U-shaped bracket 122 carries a longitudinal horizontal hinge 123, to which is connected another U-shaped bracket 124, said bracket 124 in turn carrying a vertical hinge pin 125 for connecting a pair of spaced bars 126 thereto, said bars 126 having rigidly attached thereto a tongue 127 for a wagon, not shown, that is adapted to be pulled behind the husker unit when the latter is attached to the tractor. It can be seen that this hitch structure, as shown in Figures 3 and 13, permits the tongue 127 to hinge in a vertical plane about the horizontal axis 121; to hinge in a horizontal plane about the vertical axis 125; and, to rock on its horizontal axis about the horizontal axis of the bolt 123,—three separate movements thus being provided for said tongue 127, so that the wagon will properly trail flexibly behind the husker over uneven ground traversed thereby.

The husker 96 at its rear, lower end has attached thereto, as shown in Figures 3 and 12, a hopper generally shown at 128. This hopper includes a vertical side wall 129 including an angular portion 129'. The opposite side of the hopper includes a vertical plate 130 and a separate angularly disposed side wall section 131. Thus, on one side we have the single plate 129 including its extension 129' and on the opposite side we have the two wall sections 130 and 131 in symmetrical relationship, whereby an open rear wall section is formed and in which a housing 132 for an elevator 133 may be secured to arrange said elevator 132 in a direction extending longitudinally rearwardly, as shown in Figure 3. This hopper construction is open at its bottom, so that ears delivered thereto will fall down onto the lower end of the elevator, which is disposed below the hopper 128. The lower end of the elevator husker housing is carried on the frame structure 92. The elevator 133 is driven in a manner well understood in this art, so that husked ears delivered into the hopper 128 will be removed from the husker by the elevator 133 and discharged upwardly and rearwardly from the machine to be dropped into the wagon, which is being pulled behind the machine by the tongue 127.

In some conditions of operation it may be desired to locate the elevator housing 132 in a direction transverse of the line of draft to discharge the husked ears into a wagon pulled along the stubbleward side of the tractor mounted picker and husker, and for that reason the hopper structure 128 of this invention is so designed that it may be reconstructed from parts contained within itself to make it possible to locate said elevator in such transverse direction. This position of the elevator is shown in Figures 10 and 11 as a modification, and in that connection it can be seen that the plate 129' is detached and remounted at the rear side of the hopper, as shown in Figure 10, and the plate 131 is located on the opposite side of the hopper to close off one corner thereof, whereas the plate 130 is unfastened and then secured to the opposite side of the hopper from that shown in Figure 12, so that a side opening in the hopper is provided at the stubbleward side thereof. The base plate mounting of the elevator, which is shown at 136, can then be bodily detached from the frame support 92 and be turned with the elevator housing 132 through an arc of 90 degrees. The elevator can then be positioned in said side opening formed in the stubbleward side of the hopper to locate the elevator housing 132 in a transverse, stubblewardly extending position. The parts will then all be securely bolted in place again to complete a rigid elevator structure.

In making use of the improved structure, the tractor body will be first arranged to receive the transverse outrigger 29, as described in connection with Figures 2 and 8. In other words, one portion of the shaft 29 will be secured at two points by the U-bolts 30 and 32 to the side frames 20 of the tractor body, and the opposite end of said shaft 29 will be rigidly and detachably coupled by means of the quick attachable bars 46 to the plates 39 secured to an axle housing flange 38. The outrigger 29 includes the adjusting lever 34 and the link 37.

The gathering unit will be arranged as shown in Figure 7 as a detached unit standing on the ground and made stable by the two legs 61, which will be in the position shown in Figure 7. The clamp structure 52 will be in open position, so that the tractor can be driven into or alongside the picker unit, so that the shaft 29 can be moved directly into the bearing 51, whereupon the clamp structure 52 is bolted together and the diagonal brace 63 is coupled in place, all in a manner heretofore described, and by this simple procedure the picking unit is coupled to the tractor at the side thereof to be pushed thereby. The link 37, of course, will be appropriately connected to a forward point on the picker to make adjustments of the picker up and down about the axis 29 possible, to accommodate the picker to ground conditions. Then, the legs 61 will be run up through the clamp brackets 62 on each side of the housing 53 and secured in place, so as not to constitute any obstruction to the passage of the picker unit over the ground.

The husker unit will be standing on the ground as a detached structure, as shown in Figure 6, on its legs 94. The husker structure, of course, including the hopper 104; and, the hopper 128, including the elevator 132, is tied by the brace 135 to the A-frame 99. The tractor can now be backed into the husker unit, so that the plates 39 on opposite flanges 38 of the rear axle housing will be brought to a position against the two attaching plates 97 included in the husker unit, whereupon the upper and lower bolts on the respective plates 39 can be coupled to the claw portions 47' and the key-hole slots 48' of said attaching plates 97. The counterbalance spring structure 90, which is attached to the husker frame structure, will next be coupled through the arm 88 to the plates 50 of the picker frame, as shown in Figure 9, thus establishing the counterbalancing connection for springing the weight of the picking unit. The drive chain 67, of course, will have to be wrapped around the sprocket wheel 66 on the power take-off shaft 65 of the tractor to establish driving connections from said power take-off shaft to the various operative elements included in both the picker and the husker in a manner that has already been adequately shown and described. When the parts are so related, the elevator 59 of the picker enters the hopper 104 on the husker 96 through the front open wall 105 thereof, so that obviously the elevator 59 will feed ears gathered by the picking mechanism to the husker for treatment therein. The legs 94 are, of course, brought to an elevated position off the ground before the outfit is moved over the ground to pick corn.

This completes the detailed description of the organization, and it can readily be seen that, as the tractor is driven along the row of corn, the gathering rolls 54 pinch or snap the ears from the standing stalks, said ears being delivered into the elevator 59 and thence into the hopper 104 on the husker 96, which in turn includes mechanism of conventional form to remove the husks, which are discharged onto the ground in any desired way, while the ears are carried into the hopper 128 from whence they fall onto the lower end of the discharge elevator conveyer 133 to be elevated into a wagon drawn either behind the tractor mounted outfit or to one side thereof in a manner heretofore described and made possible by the character of the hopper structure 128.

It will be appreciated now that the objects for the invention heretofore recited have been attained.

It is the intention to cover all changes and modifications of the embodiment herein disclosed for the sake of illustration which do not depart in material respects from the spirit and scope of the invention as indicated in the appended claims.

What is claimed is:

1. In a tractor mounted picker and husker, the tractor having a longitudinal body and transverse rear axle housings extending laterally from opposite sides thereof, and an outrigger support rigidly carried by the body at one side thereof in advance of a housing, the combination with the support of a picker unit rockably and detachably connected to the support alongside the tractor body, a husker unit detachably connected to the housings and supported rigidly from the rear end of the tractor, means for delivering picker corn rearwardly from the picker to the husker, a lever on the tractor including connections to adjust the picker, and a counterbalance for the picker connected between the picker and husker.

2. In a tractor mounted picker and husker, the tractor having a longitudinal body and transverse rear axle housings extending laterally from opposite sides thereof, flanges on the housings, and an outrigger support rigidly carried by the body at one side thereof in advance of a housing, the combination with the support of a picker unit having a frame rockably and detachably connected to the support alongside the tractor body, a husker unit detachably connected to flanges on the housings and rigidly supported from the rear end of the tractor, means for delivering picked corn rearwardly from the picker to the husker, a lever on the tractor including connections to adjust the picker, and a counterbalancing spring for the picker connected between the picker and husker.

3. In a tractor mounted picker and husker, the tractor having a longitudinal body and transverse rear axle housings extending laterally from opposite sides thereof, flanges on the housings, and an outrigger support rigidly carried by the body at one side thereof in advance of a housing, the combination with the support of a picker unit having a frame rockably and detachably connected to the support alongside the tractor body, means detachably connecting the support to one of the flanges on a housing, a husker unit detachably connected to flanges on the housings and supported from the rear end of the tractor, means for delivering picked corn rearwardly from the picker to the husker, a lever on the tractor including connections to adjust the picker, an arm connected to the picker frame, said arm extending rearwardly and downwardly to the rear of said support, and a counterbalance spring for the picker connected between the arm on the picker frame and the husker.

BENJAMIN M. HYMAN.